Nov. 7, 1961
S. J. PAXTON ET AL
HEATING DUCT DAMPER
3,007,673
Filed June 15, 1960
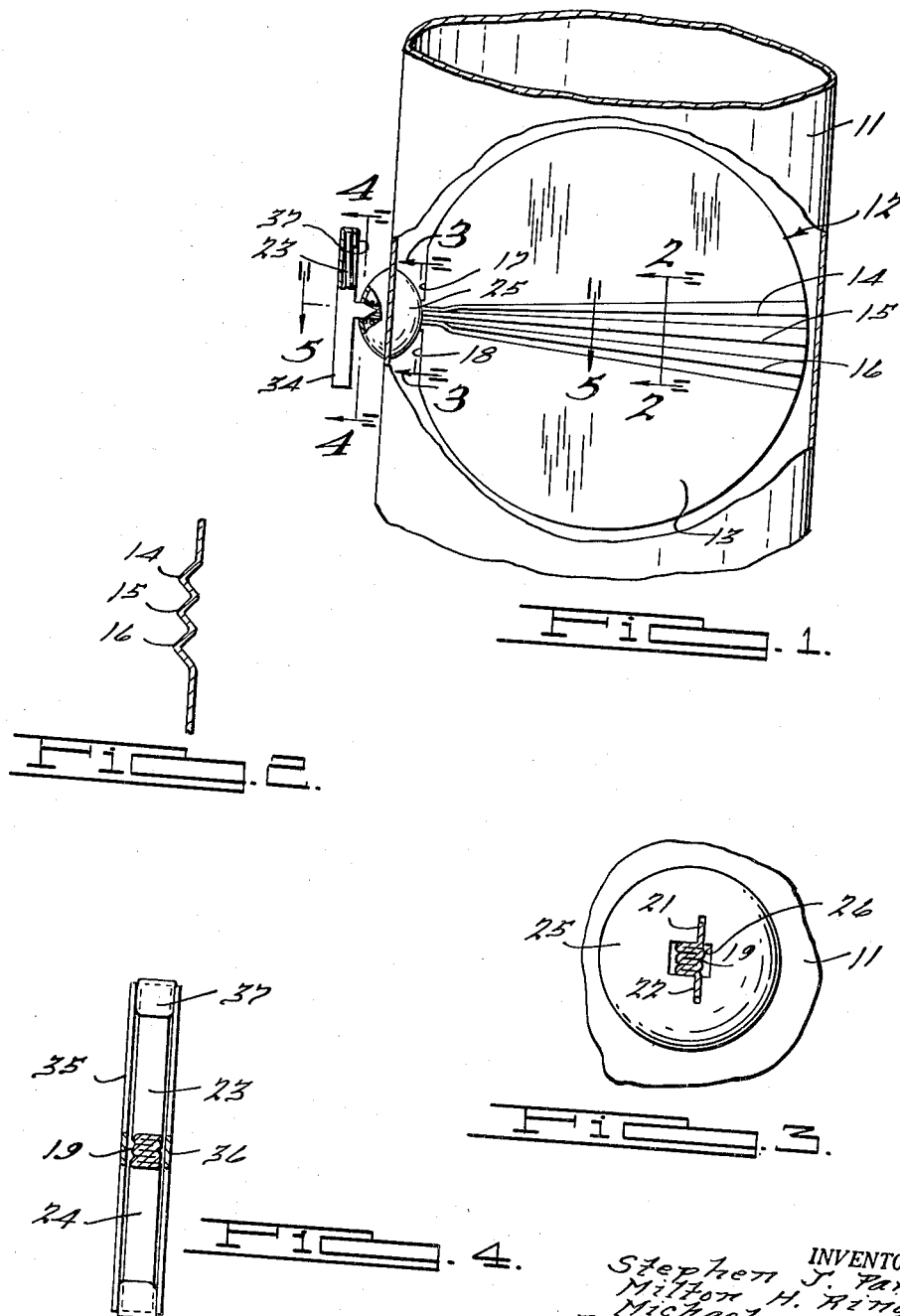

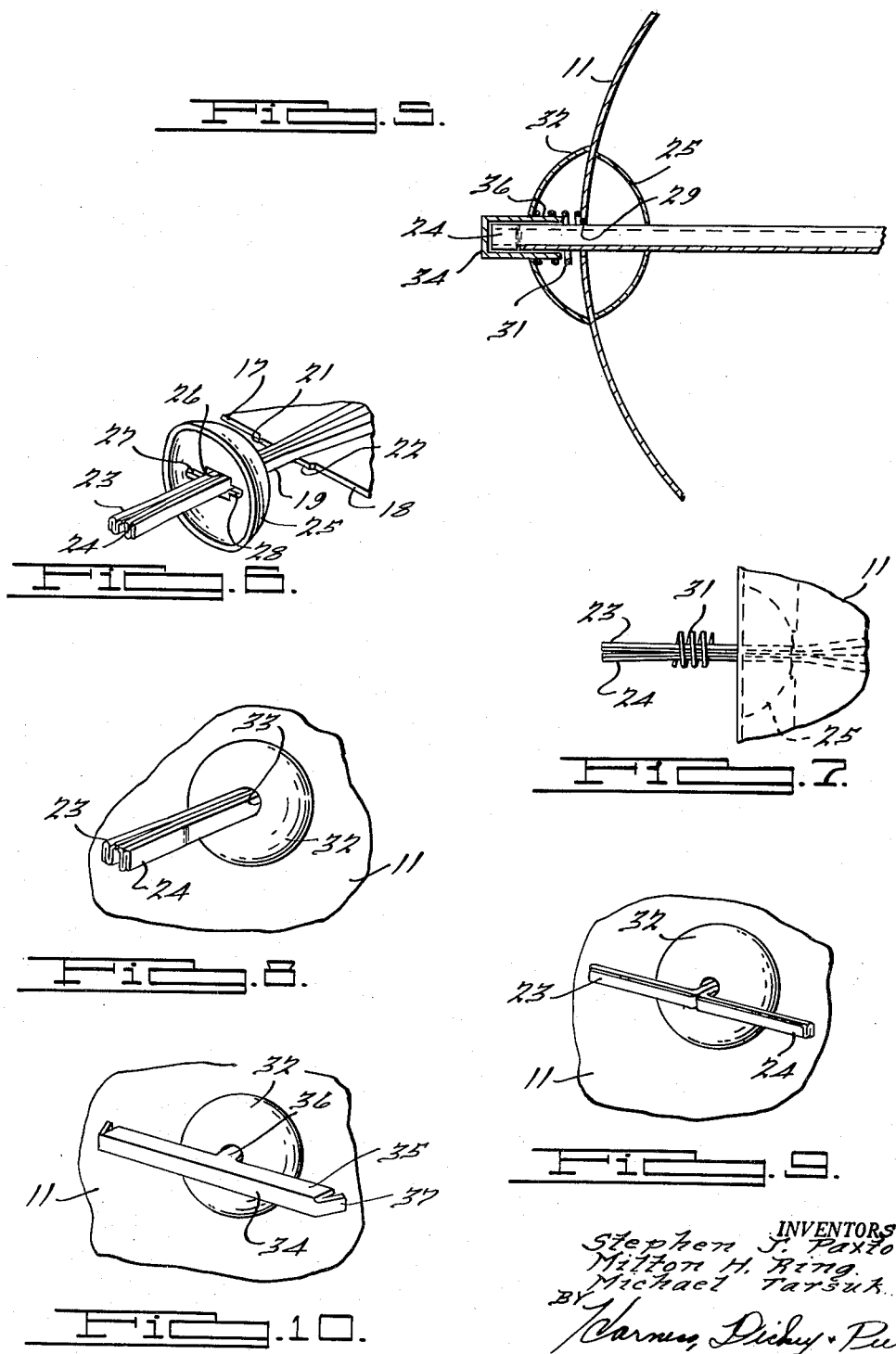

United States Patent Office 3,007,673
Patented Nov. 7, 1961

3,007,673
HEATING DUCT DAMPER
Stephen J. Paxton, 23036 Tawas, Hazel Park, Mich.;
Milton H. Ring, 22295 Maplewood, Southfield, Mich.;
and Michael Tarsuk, 2700 E. Ten Mile Road, Warren,
Mich.
Filed June 15, 1960, Ser. No. 36,380
12 Claims. (Cl. 251—297)

This invention relates to heating duct dampers, and more particularly to dampers mounted in warm air heating ducts to control the effective passageway area by manual setting of the angle of the damper within the duct.

It is an object of the invention to provide a novel and improved construction for heating duct dampers which greatly reduces the number of parts necessary for damper installation and operation.

It is another object to provide an improved heating duct damper of this nature which incorporates means for stiffening the damper plate, this means also including an integral handle arrangement for rotating the damper.

It is also an object to provide an improved heating duct damper having the above characteristics, which is relatively simple to install and which will maintain its adjusted position in an efficient and reliable manner.

Other objects, features, and advantages of the present invention will become apparent from the subsequent description, taken in conjunction with the accompanying drawings.

In the drawings:

FIGURE 1 is a perspective view of a duct section, with parts broken away and showing the novel damper of this invention in its installed position;

FIGURE 2 is a fragmentary cross-sectional view taken along the line 2—2 of FIGURE 1, and showing the pleat configuration in an intermediate portion of the damper;

FIGURE 3 is a fragmentary cross-sectional view taken along the line 3—3 of FIGURE 1, and showing the completely gathered pleat portions which form a handle shaft;

FIGURE 4 is a fragmentary cross-sectional view taken along the line 4—4 of FIGURE 1, and showing the manner of attachment of the handle cover to the split and spread pleat ends;

FIGURE 5 is a fragmentary cross-sectional view taken along the line 5—5 of FIGURE 1, and showing the washer and spring assembly in the vicinity of the duct wall;

FIGURE 6 is a fragmentary perspective view showing the first step in installation of the damper within a duct, the inner washer being slipped onto the handle shaft;

FIGURE 7 is an elevational view showing a succeeding step in the installation, with the handle shaft having been inserted in the duct aperture and the coil spring slipped on the handle shaft;

FIGURE 8 is a fragmentary perspective view of a succeeding step in the installation, with the outer washer slipped onto the handle shaft over the spring;

FIGURE 9 is a perspective view of the next step in installation, showing the outer ends of the handle shaft spread apart to form the handle; and FIGURE 10 is a perspective view showing the handle cover slipped onto the handle portion.

In general terms, the invention comprises a damper made of a flat stamped or pressed out plate adapted to fit within a heating duct of complementary shape and to be rotated to any of various angles within the duct to control the air flow therein. The plate has a plurality of pleats or folds extending generally radially, these folds being gathered at one end of the damper, this end being cut away alongside the folds so that the latter may extend through an aperture in the duct. The folds outwardly of the aperture are split and spread apart, and a cover is attached to them to form a handle. A pair of washers are mounted on the gathered ends of the folds on opposite sides of the aperture, and a coil compression spring is mounted within one of the washers to create a frictional action holding the duct in its rotated position.

Referring more particularly to the drawings, 11 indicates a duct section of circular shape in which the novel damper, generally indicated at 12, may be mounted. A duct of this nature is ordinarily mounted in a concealed location and forms part of a warm air heating system, although it will be understood that the novel constructional principles of the invention are applicable to dampers in other locations. When used in a warm air heating system for residences and the like, the damper is set when the system is installed in a desired angular position so related to the positions of other dampers of the system that a properly balanced heat distribution will be obtained. In view of the relatively few times which the damper will have to be set during its useful life, and because of its concealed nature, it is highly desirable that the cost of the damper construction as well as its associated parts be reduced to the lowest possible figure consistent with reliable operation and ease of installation and adjustment.

As shown, damper 12 comprises a flat generally circular plate 13 which may be stamped or pressed out of a sheet metal blank. Three pleats or ridge-shaped corrugations 14, 15 and 16 are formed in damper 13. These pleats may be formed by one or more stamping or pressing operations, and the pleats extend in a generally radial direction across the damper, tapering together to the left as seen in FIGURE 1. The damper adjacent the narrowed ends of the pleats is notched out as indicated at 17 and 18, the reference numerals 17 and 18 also indicating the straight tangential edges of the damper formed by the notched out portions. The gathered pleats extending from edges 17 and 18 form a handle shaft as indicated at 19 in FIGURE 6, the function of this shaft being described below. Edges 17 and 18 have slightly raised portions 21 and 22 adjacent shaft 19, as seen in FIGURE 6, for purposes which will hereinafter appear. The middle fold or pleat 15 is split from its outer end partially along shaft 19 to form two handle portions 23 and 24 as indicated in FIGURE 6, each handle portion having one and one-half folds.

In installing damper 13, shaft 19 and handle portions 23 and 24 cooperate with an inner cup-shaped washer 25 having a rectangular central aperture 26 and a pair of aligned recessed portions 27 and 28 extending outwardly from aperture 26 as seen in FIGURE 6. Washer 25 is slipped on handle portions 23 and 24 and over shaft portion 19 so that projecting edges 21 and 22 fit into recesses 27 and 28, respectively. The damper together with washer 25 may then be placed within duct 11, and handle portions 23 and 24 together with shaft portion 19 passed through an apertured portion 29 in the duct wall, as seen in FIGURE 5. Washer 25 will engage the inside of the duct wall limiting outward movement of shaft portion 19.

A compression coil spring 31 may then be slipped over handle portions 23 and 24 and shaft portion 19, as seen in FIGURE 7. Another cup-shaped washer 32 having a circular aperture 33 is then slipped onto handle portions 23 and 24 and shaft portion 19, the latter washer enclosing spring 31 as seen in FIGURE 8.

Handle portions 23 and 24 may then be spread apart as seen in FIGURE 9. The height of spring 31 is slightly greater than the depth of washer 32, the washer being pressed downwardly before handle portions 23 and 24 are spread apart. The compression of spring 31 will thus exert an outward force on handle portions 23 and 24 which will be transmitted by shaft portion 19 to damper 13. Edge portions 21 and 22 of the damper will thus be urged against washer 25, the latter engaging the inner surface of duct 11 to frictionally hold damper 13 in any adjusted position.

A handle cover 34 is provided for enclosing handle portions 23 and 24. This cover is seen best in FIGURES 1, 4 and 10 and comprises an elongated channel-shaped member having side flanges 35, the central portions of which carry pointed projections 36 capable of being inserted in aperture 33 of washer 32, as seen in FIGURES 1 and 10. Handle cover 34 encloses handle portions 23 and 24, and a pair of tabs 37 are provided at the opposite ends of the cover, these tabs being bendable around the outer ends of handle portions 23 and 24 as seen in FIGURES 1 and 4 to retain the cover in position.

When in assembled position, duct 11 may be adjusted merely by grasping handle cover 34 and turning the duct by means of shaft portion 19. The pressure of spring 31 will hold the duct in its adjusted position.

The novel damper has the advantage of greatly reducing the number and cost of parts, pleated portions 14, 15 and 16 not only serving to stiffen the damper plate, but also performing the function of a handle shaft and handle portions. All parts may be fabricated by conventional operations such as stamping or pressing, and assembly of the damper in a duct is simple, requiring no tools of any kind.

When it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. A damper for use in an air duct comprising a plate, a plurality of pleats formed in said plate, said pleats being tapered toward each other at one end of the plate, gathered-together portions of said pleats extending beyond the main body of said plate, said pleat portions having a slit and being spreadable in opposite directions to form handle portions, and means for rotatably supporting said gathered-together pleat portions between said handle portions and the main damper body.

2. In a damper construction for warm air heating ducts or the like, a plate, a plurality of pleats formed in said plate and extending generally radially, portions of said pleats being gathered together and extending from the main plate portion, the outer ends of said extending pleat portions having a slit whereby these outer end portions may be spread apart, and means rotatably supporting said gathered-together pleat portions between their spread-apart ends and the main plate portion.

3. In a damper construction for use in conjunction with a warm air duct or the like, a plate having a substantially circular shape, a plurality of pleats extending generally radially across said plate and tapering toward each other at one end of the plate, notched portions at said one end of the plate on opposite sides of said pleats, the pleats being gathered together between said notched portions to form a handle shaft extending outwardly from the main damper body, the outer ends of said extending pleat portions having a slit, said outer ends extending in opposite directions and in alignment with each other to form handle portions, and means for rotatably supporting said handle shaft.

4. The combination according to claim 3, further provided with means carried by said handle shaft for causing frictional force to be exerted between said damper and the duct, whereby the damper will be held in its adjusted position.

5. In a damper for use in conjunction with a warm air heating duct or the like, a plate having three pleats extending radially thereacross and tapering toward each other at one end, notched portions at said one end of the damper on opposite sides of said pleats, the gathered-together pleats forming a handle shaft, the outer end of the center pleat having a slit whereby the pleats may extend in opposite directions to form handle portions, an apertured portion in said duct, said handle shaft being disposed within said apertured portion with the handle portions disposed outwardly of the duct, and means carried by said handle shaft for creating a frictional connection between the duct and damper, whereby the damper will be held in its adjusted position.

6. The combinaton according to claim 5, further provided with a handle cover of channel-shaped cross-section disposed over said spread-apart handle portions, and tabs on the opposite ends of said cover extending around the handle portion ends to retain the handle cover in position.

7. The combination according to claim 5, further provided with a first cup-shaped washer on said handle shaft within said duct, the open side of said washer facing the duct, a second cup-shaped washer on said handle shaft outwardly of the duct, the open side of said second washer facing said duct, said means for creating a frictional force comprising a coil compression spring within said second washer.

8. In combination, a duct section having an apertured portion, a damper within said duct and having a substantially complementary shape, a plurality of pleats formed in and extending substantially radially across said damper, said pleats tapering toward each other at one end of said damper and extending in gathered-together fashion from the main damper portion at said one end, said gathered-together pleat portions forming a handle shaft extending through said apertured duct portion, the outer end of said handle shaft having a slit in the direction of the handle shaft whereby the pleats may extend outwardly to form handle portions, a first cup-shaped washer on said handle shaft within said duct, a second cup-shaped washer on said handle shaft outwardly of said duct, a spring within one of said washers compressed to create a frictional force between the duct and damper, and a handle cover on said handle portions.

9. The combination according to claim 8, further provided with a keyed connection between said damper and inner washer to prevent relative rotation therebetween.

10. The combination according to claim 8, said handle cover comprising an elongated member of channel-shaped cross-section covering said handle portions, tabs at the opposite ends of said cover extendable around the outer ends of said handle portions, and projections at intermediate portions of said cover receivable by said outer washer.

11. A damper for use in an air duct comprising a sheet metal plate, an element formed integrally with said plate and extending from the main portion thereof, an apertured portion in said duct rotatably supporting said extending plate element, and two handle portions integral with and at the outer end of said extending plate element, said handle portions being movable from a first position in juxtaposed parallel relation to enable insertion of said extending plate element into said duct aperture, to a second position in spread-apart relation whereby the handle portions may be grasped to rotate said damper.

12. A damper for use in an air duct comprising a plate, a pleated portion formed on and extending outwardly from said plate, the outer end of said pleated portion having a slit and extendable in opposite directions to form handle portions, and means for rotatably supporting said pleated portion between said handle portions and said plate.

No references cited.